United States Patent [19]
Grajski et al.

[11] Patent Number: 6,052,481
[45] Date of Patent: *Apr. 18, 2000

[54] AUTOMATIC METHOD FOR SCORING AND CLUSTERING PROTOTYPES OF HANDWRITTEN STROKE-BASED DATA

[75] Inventors: Kamil A. Grajski, San Jose; Yen-Lu Chow, Saratoga, both of Calif.

[73] Assignee: Apple Computers, Inc., Cupertino, Calif.

[ * ] Notice: This patent is subject to a terminal disclaimer.

[21] Appl. No.: 08/300,426

[22] Filed: Sep. 2, 1994

[51] Int. Cl.$^7$ .............................. G06K 9/00; G06K 9/48; G06K 9/62
[52] U.S. Cl. .......................... 382/187; 382/198; 382/215; 382/225; 395/2.65
[58] Field of Search ...................................... 382/187, 253, 382/179, 180, 188, 190, 215, 224, 225, 191, 197, 198; 348/414, 417, 418; 395/2.54, 2.65, 2.62, 2

[56] References Cited

U.S. PATENT DOCUMENTS

| | | | |
|---|---|---|---|
| 4,191,940 | 3/1980 | Polcyn | 382/128 |
| 4,384,273 | 5/1983 | Ackland et al. | 382/215 |
| 4,467,437 | 8/1984 | Tsuruta et al. | 382/215 |
| 5,040,222 | 8/1991 | Muroya | 382/215 |
| 5,067,166 | 11/1991 | Ito | 382/215 |
| 5,181,256 | 1/1993 | Kamiya | 382/215 |
| 5,343,537 | 8/1994 | Bellegarda et al. | 382/186 |
| 5,459,809 | 10/1995 | Kim et al. | 382/160 |

OTHER PUBLICATIONS

"A VQ Based Preprocessor Using Cepstral Dynamic Feature for Speaker Independent Large Vocabulary Word Recognition" Sadoki Furui, IEEE Transaction vol. 36 No. 7. Jul. 1988.

Soft Decision Vector Quantization Based on the Dempster/Shafer Theory F. Class et al. Daimler Benz AG Research Institute. 1991 IEEE. CH 2977–7/910000–0665.

On line Adaptive Vector Quantization with Variable Size CodeBook. Cornel Constantiescu et al. 1993 IEE 0–8186–3392–193.

*Primary Examiner*—Bipin Shalwala
*Attorney, Agent, or Firm*—Sawyer & Associates

[57] ABSTRACT

A system and method for processing stroke-based handwriting data for the purposes of automatically scoring and clustering the handwritten data to form letter prototypes. The present invention includes a method for processing digitized stroke-based handwriting data of known character strings, where each of the character strings is represented by a plurality of mathematical feature vectors. In this method, each one of the plurality of feature vectors is labelled as corresponding to a particular character in the character strings. A trajectory is then formed for each one of the plurality of feature vectors labelled as corresponding to a particular character. After the trajectories are formed, a distance value is calculated for each pair of trajectories corresponding to the particular character using dynamic time warping method. The trajectories which are within a sufficiently small distance of each other are grouped to form a plurality of clusters. The clusters are used to define handwriting prototypes which identify subcategories of the character.

11 Claims, 8 Drawing Sheets

T1 = { P1, P2, P3, P4 }
T2 = { S1, S2, S3, S4 }

$d_{DTW} = 0.0$ $d_{DTW} = 0.05$ $d_{DTW} = 1.33$ $d_{DTW} = 3.7$

AUTOMATIC METHOD FOR SCORING AND CLUSTERING PROTOTYPES OF HANDWRITTEN STROKE-BASED DATA

BACKGROUND OF THE INVENTION

The present invention relates generally to a method for processing handwritten data for training a handwriting recognizer, and more particularly to an automatic method for scoring and clustering prototypes of stroke-based handwriting data.

A handwriting recognizer is a combination of computer hardware and software that accepts handwritten data as input and attempts to match handwritten symbols with known letters and words. Before this can occur, however, the handwriting must be transformed into data that the recognizer can understand and manipulate. This is known as front-end processing of the handwriting data.

In front-end processing, a user must first write on a digitizing tablet or similar hardware device using a special stylus or pen so that the handwriting may be electronically recorded. The handwriting may be described as a time sequence of strokes, where a stroke is the writing from the time the pen is placed down on the tablet until the pen is lifted. Each stroke is recorded as a time series of x- and y-coordinates, called sample points, that represent the path of the pen across the tablet. FIG. 1 is a graphical example of sample points generated from a digitized handwriting sample. The stars in FIG. 1 indicate sample points of the pen taken at uniform time intervals.

Digitized handwriting samples can be characterized as a type of signal that has observable properties. The strokes of a particular sample may vary in both their static and dynamic properties. Static variation occurs in stroke size and shape, while dynamic variation occurs in the number of strokes in a sample and the order in which they are recorded. Handwriting variability stems from the fact that different people, or even the same person, write(s) any given character, symbol, or letter in a variety of ways. The degree of variation depends on the style and speed of writing, with hasty writing usually showing greater variation. It is this variation in handwriting which must be taken into account by a handwriting recognition system.

A common handwriting recognition method analyzes the variation in handwriting by partitioning handwritten words into segments, where a segment is a portion of a stroke. Sequences of segments are then used to identify letters by analyzing the static and dynamic properties of the segments. Application Ser. No. 08/204,031 in the name of the same inventors and the same assignee as the present application, discloses a front-end processing method for extracting both static and dynamic properties from a handwriting sample using non-uniform segmentation and feature extraction.

As disclosed in appl. Ser. No. 08/204,031, the segmentation process partitions strokes into a series of separate segments by defining a segment as the trajectory resulting from a complete upstroke or downstroke of the pen. Stated another way, segment endpoints occur where the pen touches down on the writing surface, leaves the writing surface, or changes vertical direction during writing. FIG. 2 is a graphical example of segmentation and feature extraction performed on the word "act" which is written as a single stroke. Points 20, 22, and 24 shown on the letter "a" are examples of segment endpoints in the stroke forming the word "act". Segment endpoint 20 is the initial starting point of the pen during the first upstroke formed in the letter "a"; segment endpoint 22 is the transition point between the first upstroke and a downstroke; and segment endpoint 24 is the transition point between the downstroke and a second upstroke.

A segment is thus defined as a set of coordinates falling between a pair of segment endpoints. An example of one segment comprising the letter "a" is segment 30, which is described by a list of those coordinates in the letter "a" located between segment endpoint 22 and segment endpoint 24.

Feature extraction refers to the process where static properties, called features, are extracted from the coordinate data of each segment in the stroke. Examples of features extracted from a segment include the net distance between the endpoints of the segment in the x-direction, and the net distance between the endpoints of the segment in the y-direction, shown by the $\Delta$-X and $\Delta$-Y in FIG. 2. Other features extracted from the segment 30, include the coefficients of a third-order polynomial fitted separately to the x- and y-sample points contained in the segment 30. This feature provides information regarding the curvature of the segment 30.

The value of each feature extracted from the segment 30 is stored in a vector, called a feature vector. A feature vector is mathematically represented as $F(i)=[fi1, fi2, \ldots, fip]$; where F stands for feature vector, f is a feature value, i is the number of the current segment, and p is the number of features extracted per segment. The number of features extracted per segment is termed the "dimensionality" of the feature vector. For example, if six features are extracted from the segment, the resulting feature vector exists in six-dimensional feature space. The output of the feature extraction process for a given handwriting sample is a set of feature vectors, where each feature vector corresponds to a segment in the sample. Each set of feature vectors is then used as input to a handwriting recognizer for recognition.

Given an observed set of feature values, the goal of a handwriting recognizer is to determine the most likely character string or letter corresponding to those feature values. One approach to achieve this goal is the use of probabilistic models to characterize statistical properties of a particular signal. The most popular stochastic approach today in handwriting recognition is Hidden Markov Modelling.

In Hidden Markov Modelling, each letter in the alphabet is modeled statistically by a single Hidden Markov Model (HMM). During recognition, the observed set of feature vectors of the letter to be recognized are input to the set of HMMs. Each HMM then calculates the probability that a handwritten version of its corresponding letter could have produced the sequence of feature vectors generated. The letter identified during the recognition process is the letter whose HMM produced the highest probability of producing the observed sequence of feature vectors.

FIG. 3 graphically shows the form of a letter-specific HMM 32. The HMM 32 may be described at any time as being in one of a set of x distinct states, S1, S2, ..., Sx (where x=3 in FIG. 3). Each state of the HMM 32 is associated with one or more input feature vectors of a particular handwriting sample. Since the observable properties of handwritten data varies over time as a writer forms strokes, the HMM 32 also moves from one state to another over specified time intervals. The HMM 32 is called a left-right model because the underlying state sequence associated with the model has the property that as time increases the states value monotonically increases, or, graphically, the states proceed from left to right.

The changes of state in HMM 32 is determined by a set of transition probabilities associated with each state. Transition probabilities are probabilities that for a given time interval, a state will: stay in the same state, shown by the loop arrows 34a, 34b, and 34c; transition from one state to the next, shown by the arrows 36a and 36b; or by-pass the next state in sequence, shown by the arrows 38a and 38b. The total of all probabilities of the transitions from a particular state equals one. The probability of a given model producing the observed sequence of feature vectors, Fl to Fn, is obtained by multiplying the probabilities of the transitions associated with the trajectory. In addition to transition probabilities, each state S1, S2, and S3, has associated with it statistical information relating to the distribution of feature vectors.

As stated above, each state in the HMM 32 is associated with one or more observed feature vectors. The number of feature vectors mapped to each state equals the total number of feature vectors observed divided by the number of states in the HMM. For example, if six segments were generated from a handwritten letter, and the three-state HMM 32 is used to model the letter, then each state S1, S2, and S3 would correspond to two feature vectors (6 feature vectors\3 states). The first two feature vectors from the occurrence would map to the first state S1; the second two feature vectors would map to the second state S2; and the last two feature vectors would map to the third state S3.

A beginning state i, and an end state f, of the HMM 32 are not associated with any feature vectors. Arrow 31 represents the transition from the start of the letter, state i, to the first state S1, and arrow 39 represents the transition from the last state S3 to the end of the letter, state f. For more information on the mathematical algorithms behind HMMs, see Lawrence Rabiner, *A Tutorial on Hidden Markov Models and selected Applications in Speech Recognition,* IEEE, 1989.

For an HMM to become useful in the recognition process, the statistics used in the probability calculations must first be compiled. This is an iterative process called training in which the statistical properties of feature vectors obtained from samples of handwriting, called training data, are analyzed. To obtain reliable statistics for the feature data, the training data must contain a large vocabulary of words written by a large pool of writers to ensure a representative set of feature vectors.

Before feature data is extracted from the training set, the handwriting must be visually inspected to ensure the quality of the training set. Only accurate representations of a particular letter are allowed to remain in the training set, while sloppy or non-representative letters are discarded. Otherwise the statistics generated from the samples would become distorted, resulting in poor recognition. The process of inspecting hundreds or thousands of samples of handwriting is time-consuming, tedious and prone to error when done by visual inspection.

In addition, the current practice of generating one HMM for each letter in the alphabet may be insufficient for proper recognition due to wide variations observed in different occurrences of a given letter due, for instance, to different styles of writing a letter. For a given file of stroke-based handwriting data, the file will contain multiple occurrences of a particular letter, such as the letter "a". Since each occurrence of the letter has different properties, each occurrence will generate a different set of feature vectors. As disclosed in application Ser. No. 08/204,031, multiple vector quantization may then be performed on each feature vector to determine the distribution of the feature vectors in the multidimensional feature space. Each feature vector, corresponding to each segment, is characterized as occupying a single point in the feature space, as shown in FIG. 4A.

FIG. 4A is a graphical representation of a three-dimensional feature space where the four feature vectors P1, P2, P3, and P4, correspond to four segments of a letter. In multiple vector quantization, the distribution of the feature vectors in space corresponding to all occurrences of a letter is then used to generate an HMM for that letter, based on statistical properties of the distribution.

One disadvantage of characterizing feature vectors as fixed points in space for the generation of HMMs is that the feature vectors corresponding to all occurrences of a particular letter may not occupy the feature space in a uniform manner. Certain regions of the space corresponding to a commonly written style of the letter will be highly occupied, and other regions may be sparsely occupied. Consequently, the statistics relating to the sparsely occupied regions of the letter space will be not be adequately represented by the HMM. Since the resulting HMM represents an average between the sparse regions and the dense regions, a loss in resolution of the data will occur. Therefore, the use of only one HMM to statistically model all possible occurrences of a letter may be inadequate for accurate recognition.

A possible solution may be to partition the data space of a letter into subcategories based on upper case occurrences of a letter, and lower case occurrences of the letter. In this intuitive approach, the feature vectors corresponding to upper case letters would be clustered into one group, while the feature vectors corresponding to lower case letters would be clustered into a second group. A separate HMM could then be generated to model the behavior of the respective groups. However, the partitioning of the data space to derive the two separate subcategories would be done based on human concepts of how the data space should be partitioned, rather than based on properties inherent in the feature data.

By definition, a subcategory of a letter denotes similarly written occurrences of the letter which produce similar feature vectors. If every occurrence of a letter generated the same number of segments, then computing the similarity between the occurrences is straightforward, as the following example illustrates.

Assume an occurrence of the letter "a" generated four segments and six features are extracted from each segment. This would result in four features vectors, each containing six values. Referring back to FIG. 4A, these four features vectors, shown as P1, P2, P3, and P4, could then be characterized as a fixed point in a 24-dimensional space (4 segments×6features). Assuming a second occurrence of the letter "a" generated four segments and corresponding feature vectors, then the similarity between the two occurrences can be calculated by measuring the Euclidean distance between the two sets of vectors in the 24-dimensional space.

However, based on differences in writing styles, writing speeds, etc., it is known that occurrences of the same letter produce varying number of segments. When occurrences of a letter do not have the same number of segments, the distance between the corresponding features vectors cannot easily be computed due to the different dimensionalities of the data. For example, assume a third occurrence of the letter "a" produces seven segments with corresponding feature vectors. This occurrence of the letter "a" occupies a 42-dimensional space (7 segments×6 features), in contrast with the first two occurrences of the letter "a", described above, which occupy a 24-dimensional space. Given occurrences of a letter having differing numbers of feature vectors, a difficulty lies in determining their similarity.

To solve this problem, rather than characterizing a letter occurrence as a single feature vector, the letter occurrence may better be characterized as a sequence of points in space, called a trajectory. It should be noted that in the present specification a "trajectory" of a letter does not refer to the shape of the letter as drawn by the path of a pen. Rather, in the present specification, a "trajectory" is the path in feature space formed by a sequence of feature vectors corresponding to the segments of a letter.

FIG. 4B is a diagram illustrating the trajectory of two occurrences of a letter in three-dimensional feature space, where each trajectory is formed from a sequence of four feature vectors. Although a three-dimensional feature space is shown in FIGS. 4A–4B, in general the feature space will have a higher dimensionality. The first letter occurrence is represented by trajectory Ti which contains four feature vectors, P1, P2, P3, and P4. The second letter occurrence is represented by trajectory T2 which also contains four feature vectors, S1, S2, S3, and S4. The feature vectors for T1 correspond to the feature vectors shown in FIG. 4A. Unlike in FIG. 4A, however, the feature vectors P1, P2, P3, and P4 are not combined to form a single vector, but rather they are combined to form a trajectory through feature space.

The problem in determining the similarity between the two letter occurrences is that the trajectory for the second occurrence T2 is shorter in overall vector length than the trajectory for the first occurrence T1 even though both T1 and T2 depict the same letter. Also compounding the problem is the fact that a trajectory of a first letter occurrence may contain a different number of feature vectors than the trajectory of a second letter occurrence. If the feature vectors of letter occurrences are to be characterized as variable length trajectories, then the similarity of two such trajectories cannot be determined by simply measuring the distance between vectors.

The foregoing discussion illustrates why it has been difficult to determine the existence of subcategories of similar letter occurrences in feature space. The difficulty in determining the existence of subcategories is also the reason why in general only one HMM has been used to model all occurrences of a particular letter.

Accordingly, it is an object of the present invention to provide a method for calculating the similarity between occurrences of a particular letter, and more particularly, it is an object of the present invention to provide an automatic method for discovering from a handwriting training data, subcategories of a particular letter in feature space that correspond to similar letter occurrences.

It is a further object of the present invention to provide a plurality of interacting HMMs for each letter of the alphabet, where each HMM models a subcategory of letter occurrences for the particular letter.

It is another object of the present invention to provide an unsupervised automatic method for screening handwriting data.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY OF THE INVENTION

The present invention includes a method for processing digitized stroke-based handwriting data of known character strings, where each of the character strings is represented by a plurality of mathematical feature vectors. In this method, each one of the plurality of feature vectors is labelled as corresponding to a particular character in the character strings. A trajectory is then formed for each one of the plurality of feature vectors labelled as corresponding to a particular character. After the trajectories are formed, a distance value is calculated for each pair of trajectories corresponding the particular character using a dynamic time warping method. The trajectories which are within a sufficiently small distance of each other are grouped to form a plurality of clusters. The clusters are used to define handwriting prototypes which identifying subcategories of the character.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

DESCRIPTION OF THE PREFERRED EMBODIMENT

The present invention will be described in terms of the preferred embodiment. The present invention is a method for processing stroke-based handwriting data for the purposes of automatically scoring and clustering the handwritten data to form letter prototypes. In a file of handwriting data containing occurrences of a particular letter, each occurrence of the letter is represented as a series of feature vectors, and a trajectory in feature space is formed for each occurrence using the series of feature vectors. Scoring refers to the use of dynamic time warping to calculate a numerical value for a pair of occurrences of the same letter which indicates their similarity with respect to one another. Clustering refers to the process of forming a relatively small number of groups of the trajectories based on the numeric similarity scores to represent the spread of the letter occurrences in the feature space. Given N occurrences of a letter, between 1 and N groups, called clusters, are generated. Each occurrence of the letter is then assigned to a cluster based on the average similarity score between its trajectory and the trajectories of the members in each cluster.

Each cluster of trajectories formed in the feature space is then used to define prototypes for a particular letter. A prototype therefore represents similar occurrences of the same letter. Thus, if five clusters of the letter "a" are generated by the methods described herein, then five prototypes of the letter "a" have automatically been defined. The resulting prototypes are widely applicable in handwriting processing. For instance, the prototypes may be used to generate a plurality of HMMs corresponding to a letter, rather than using one HMM to model the letter, where each HMM models a subcategory of the letter "a", for example. Accordingly, the HMM approach of the present invention is a significant advance in recognition over the prior art approach of modelling all occurrences of a letter with a single HMM. The present invention may be used in either a real time or non-real time handwriting recognition system, and may be adapted to process a single input word or a series of words.

Figure 5:
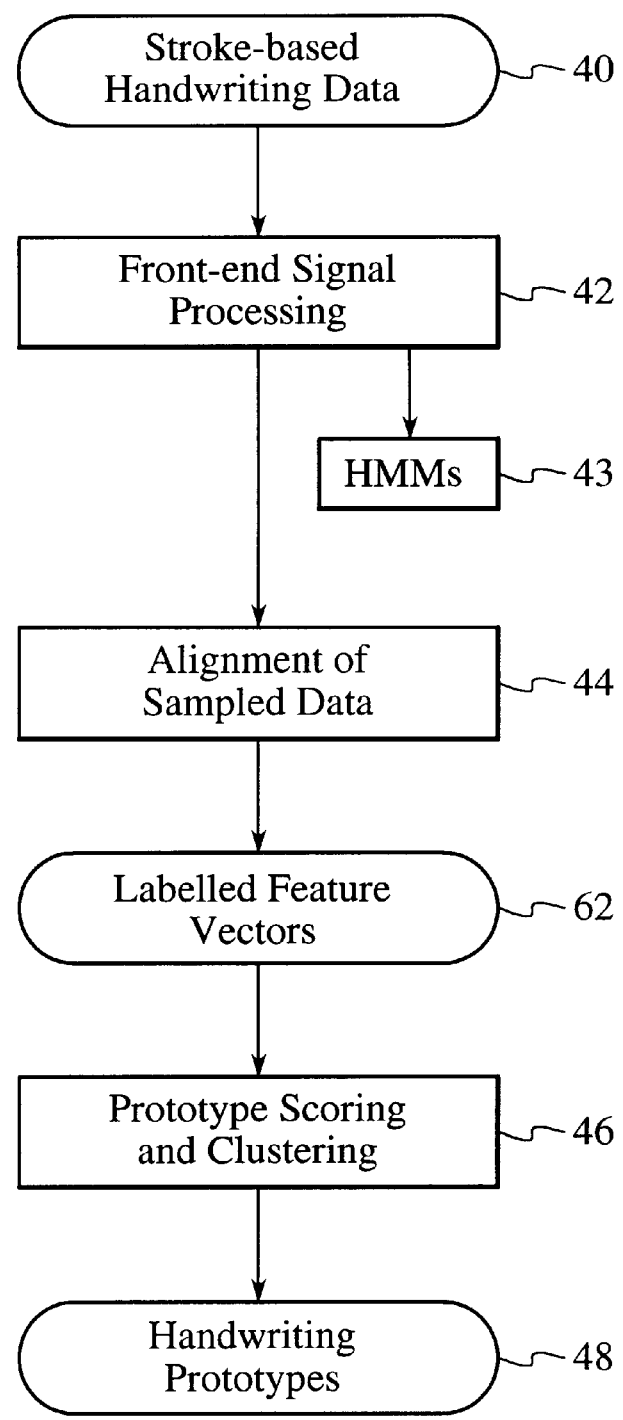
FIG. 5 is a block diagram illustrating the primary processing steps performed by the handwriting processing system of the present invention.

FIG. 5 is a block diagram illustrating the primary processing steps performed by the handwriting processing system 38 of the present invention. The handwriting processing system 38 subjects a file of stroke-based handwriting data 40 representing training words to a front-end signal processing step 42 to generate a set of HMMs 43, as described in previously identified application Ser. No. 08/204,031, which is herein incorporated by reference. The unsupervised aspect of the present invention is achieved through an alignment process 44, which uses the HMMs to automatically assign segments in the stroke-based data 40 to individual letters, producing a file of labelled feature vectors 62. As explained in further detail below, the primary focus of the present invention is a prototype scoring and clustering process 46, where similarity scores between pairs of trajectories of occurrences of the same letter are computed using a dynamic time warping method. The similarity scores are then used to cluster the trajectories using an agglomerative clustering technique. The clusters are then used to identify handwriting prototypes 48.

The features and principles of the present invention will now be explained in detail. As disclosed in application Ser. No. 08/204,031, during front-end processing 42, non-uniform segmentation and feature extraction are performed on the stroke-based data 40 to produce a series of segments and associated feature vectors for each test word. Multiple vector quantization is then performed on each series of feature vectors, and the output of the vector quantization process, called codebooks, is used to generate a set of HMMs 43. Each HMM 43 is used to model a particular letter in the alphabet.

Figure 6:
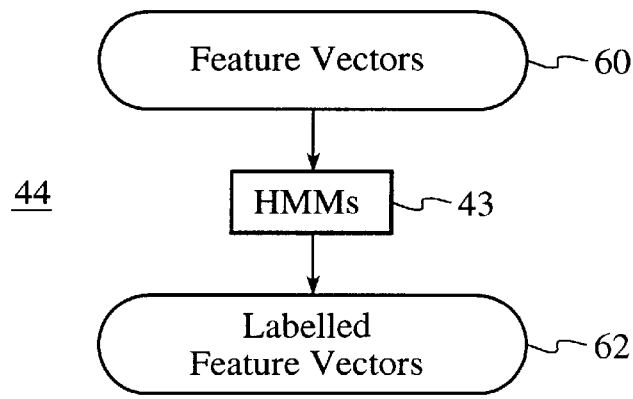
FIG. 6 is a block diagram illustrating the Alignment process.

FIG. 6 is a block diagram illustrating the alignment process 44. After the front-end process 42 generates a file of feature vectors 60 for the segments of each training word, the alignment process 44 uses the HMMs 43 to label the feature vectors as belonging to one of the letters in the word. The alignment process 44 is necessary because, although the words in each training file are known, it is not known which segments belong to which letters.

The alignment process 44 assigns feature vectors to the letters of each training word by activating the HMMs 43 corresponding to the letters comprising the training word. Each of the selected HMMs 43 then calculates the probability that the HMM could have produced those feature vectors. The feature vectors are then assigned to the letter whose HMM 43 generated the highest probability. For example, to align a feature vector generated from the word "act", the HMMs 43 corresponding to the letters "a", "c", and "t", would be activated, and the feature vector would be assigned to the letter corresponding to the HMM 43 that computed the highest probability. After a feature vector has been aligned with a letter, a label is appended to the feature vector identifying the letter to which it has been assigned. In the example above, each feature vector corresponding to the word "act" would be labelled as belonging to either the letter "a", "c", or "t". The output of the alignment process 44 is a file for each training word that contains a set of labelled feature vectors 62.

Figure 7:
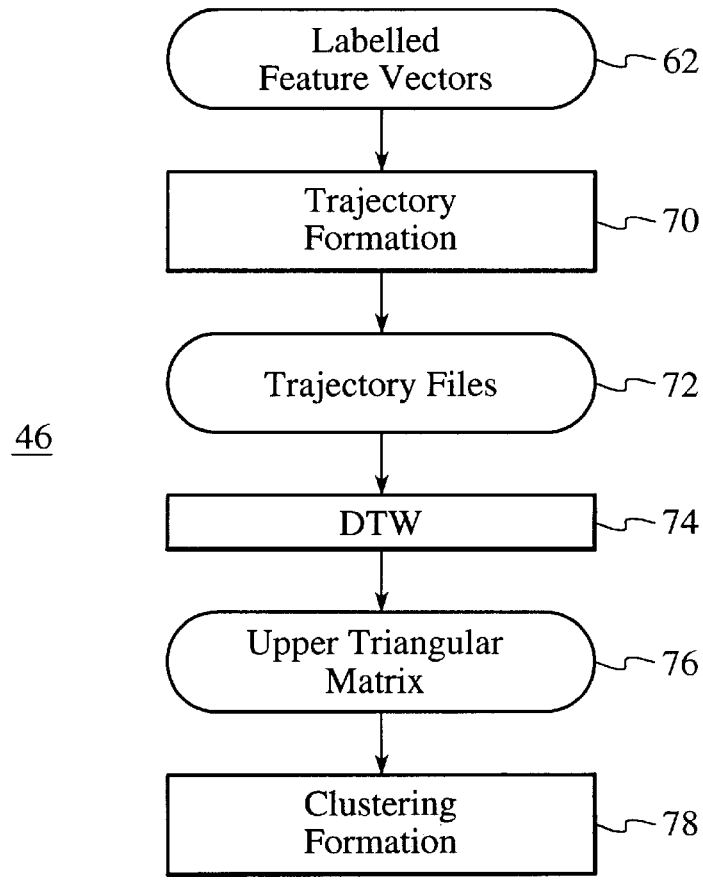
FIG. 7 is a block diagram illustrating the prototype scoring and clustering process of the present invention.

FIG. 7 is a block diagram illustrating the prototype scoring and clustering process 46 of the present invention. After the alignment process 44 generates the labelled feature vectors 62, the trajectory formation process 70 creates a trajectory for each letter in a training word formed from the feature vectors labelled as belonging to each particular letter. For the letter "a" in "act", for instance, a trajectory T1 would be formed from the segments labelled as belonging to the letter "a." Two additional trajectories would be formed for the letters "c" and "t" in the same manner. After trajectories have been formed for every letter in each training word, all the trajectories corresponding each letter in the alphabet are separated from the words and stored in separate files called trajectory files 72. Given N occurrences of a particular letter found in the handwriting data 40, the trajectory file for that letter will contain N trajectories.

After the trajectory formation process 70, the prototype scoring and clustering process 46 measures the similarity of trajectories corresponding to a particular letter, using a mathematical technique used in speech recognition known as Dynamic Time Warping (DTW) 74. In the present invention, DTW 74 is applied to stroke-based handwriting data to assign a numeric similarity score to all possible pairings of the trajectories for a letter, where the trajectories may have differing numbers of feature vectors.

In DTW 74, given a pair of trajectories $T_1$ and $T_2$ corresponding to two occurrences of a letter:

$T_1 = \{P1, P2, \ldots, Pn\}$, and $T_2 = \{S1, S2, \ldots, Sm\}$;

where $T_1$ comprises n feature vectors, and $T_2$ comprises m feature vectors, one trajectory serves as the reference trajectory to which the second trajectory is compared. Assuming $T_1$ is the reference vector, then a matrix $D(i,j)$ is constructed to calculate the separation distance in feature space between the reference trajectory, T1, and the trajectory T2.

Figure 8:
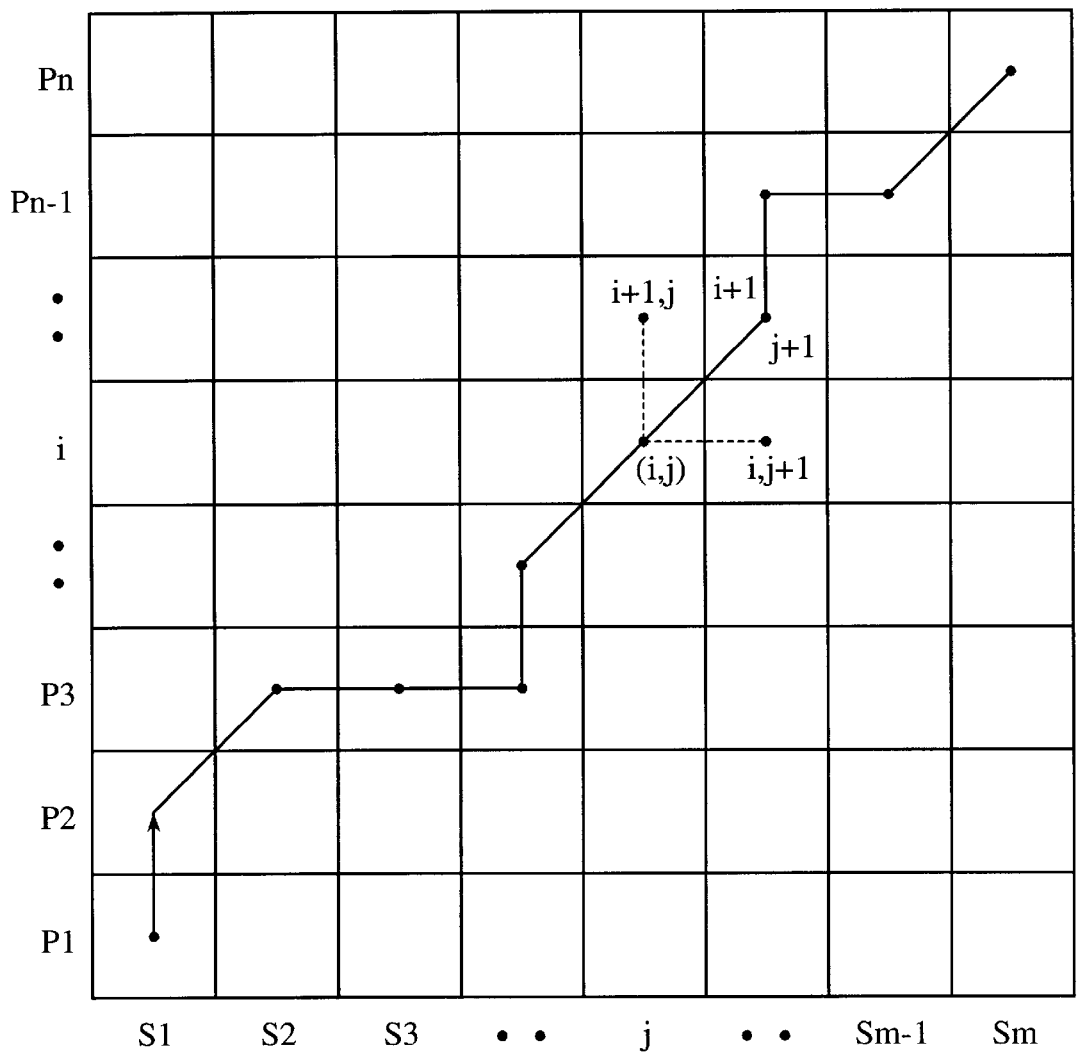
FIG. 8 is a diagram graphically illustrating a matrix $D(i,j)$ used to calculate, using dynamic time warping, the distance between a reference trajectory T1 and a second trajectory T2.

The matrix $D(i,j)$ is represented graphically in FIG. 8. The reference trajectory $T_1$ feature vectors $P_1, P_2, \ldots, P_n$, are listed along the y-axis, and the trajectory $T_2$ feature vectors $S_1, S_2, \ldots, S_m$, are listed along the x-axis. The y- and x-axes define a lattice where square $(i,j)$ contains the separation distance between feature vector $P_i$ of trajectory $T_1$ and feature vector $S_j$ of Trajectory $T_2$. Proceeding from the bottom left square (1,1) and terminating at the top-right of the lattice (m,n), standard dynamic time warping methods are used to find the shortest sequence, or optimal path, through the lattice which maps the feature vectors of Trajectory $T_2$ to one or more of the feature vectors of the reference Trajectory $T_1$. For the purpose of this disclosure, all the paths calculated through the lattice are called entry-to-entry paths. An overall similarity score, $d_{DTW}$, between the trajectories $T_1$ and $T_2$ is computed by adding all the distances in the entry-to-entry paths along the shortest overall entry-to-entry path through the lattice.

An entry-to-entry path consists of a sequence of steps to a neighboring square immediately to the right, immediately above, or immediately above and to the right. In FIG. 8, if the point (i,j) is on the optimum path through the lattice, then the next point on the path must be (i+1, j), (i+1, j+1), or (i, j+1). The particular measure of the distance between a pair of feature vectors, such as the a Euclidean distance, is not important, so long as the measure chosen is consistent with each of the distances calculated between the pairs of feature vectors in the lattice. It should also be noted that in the above procedure, the value of $d_{DTW}$ is the same for a pair of trajectories regardless of which is considered the reference vector.

Figure 9A:
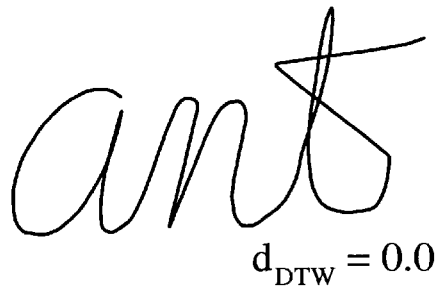
FIGS. 9A–9D are diagrams showing examples of training words having the letter "a", and associated similarity scores for the letter "a" generated by dynamic time warping.
Figure 9B:
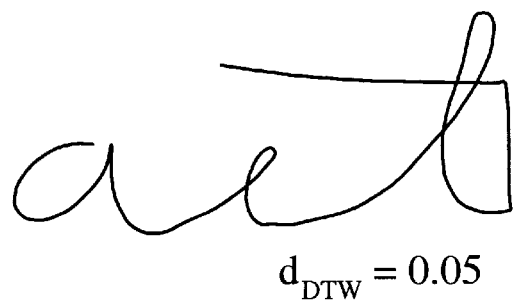
Figure 9C:
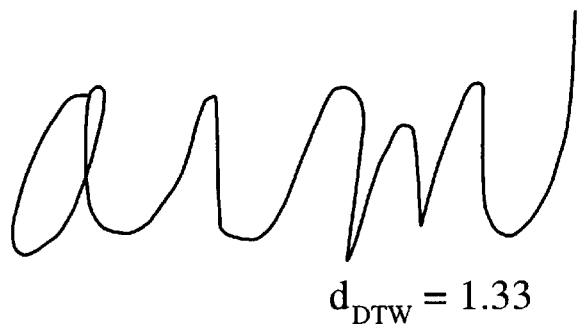
Figure 9D:
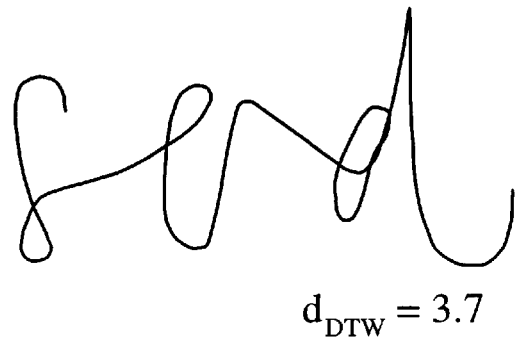

FIGS. 9A–9D are diagrams showing examples of occurrences of the letter "a" taken from training words, and associated similarity scores $d_{DTW}$. FIG. 9A shows an arbitrary occurrence of the letter "a" which, for the present purpose will serve as the reference for which the occurrences of the letter "a" in FIGS. 9B–9D are compared. In FIG. 9A, note that the similarity, or distance, $d_{DTW}$ of the reference to itself is zero. In FIG. 9B a second occurrence of the letter "a" is shown along with its similarity score to the reference. FIGS. 9C and 9D complete the sequence showing progressively increasing distances between the third and fourth occurrences of the letter "a" and the reference. FIG. 9D depicts the word "sad," in which the second letter is the letter "a".

As stated above, DTW 74 has been widely used in speech recognition for some time, but speech data consists of a single variable (the voltage output of a microphone) measured over time. When applied to the field of handwriting, DTW 74 has only been used to measure the distance of stored feature vectors that represent ideal words to incoming feature vectors to measure similarity for the purpose of recognizing the written letter or word. A primary feature of the present invention is that DTW 74 is not used for the recognition of handwriting per se but rather as a step in the processing of handwriting data to aid in the clustering of handwriting data trajectories in feature space, as explained further below.

In the present invention, only the final similarity score $d_{DTW}$ between a pair of trajectories is required for the subsequent clustering step. Thus, for each possible pair of trajectories for N occurrences of a letter, the final similarity score $d_{DTW}$ calculations are stored in an (N×N) distance matrix, i.e., the similarity score $d_{DTW}$ between the $i^{th}$ and $j^{th}$ trajectories $T_i$ and $T_j$ is stored as the (i,j) entry of the distance matrix. The distance matrix is conceptually similar to a distance chart listing the distances between U.S. cities, where the cities are listed along both the top and a side of the chart, and the distance between any two cities is located at their intersection point on the chart.

Referring back to FIG. 7, the present invention utilizes what is known in the art as an upper triangular matrix 76 to store the similarity scores. The upper triangular matrix 76 only stores values in the upper triangular region of the matrix (i.e., the (i,j) entries where $i \leq N+1-j$) because the score between trajectory pair (i,j) will be the same as the score between pair (j,i). Thus redundant scores are discarded, saving memory space.

The clustering formation process 78 automatically creates clusters of occurrences using the similarity scores calculated for the trajectories of the occurrences. In a preferred embodiment of the present invention, an agglomerative clustering process is used to form the clusters. The agglomerative clustering process begins by initializing each of the N occurrences of a letter as a unique cluster, thus resulting in N clusters. The term "agglomerative" is used because successively fewer clusters are then created using an iterative merging process, where the two closest or most similar clusters are merged each iteration.

To begin merging the N clusters, a pair of trajectories having the lowest similarity score in the upper triangular matrix 76 are placed into a single cluster, resulting in N-1 clusters. To find the next closest pair of trajectories to be merged into the cluster, it is not possible simply to compare similarity scores of the trajectories. Because the newly formed cluster contains two trajectories that have varying lengths and therefore occupy different feature spaces, it is not possible to form a centroid, or other mean value representation to characterize that cluster. Consequently, to measure the distance between a trajectory and a cluster, the distance is defined as the average distance between that trajectory and all members of the cluster.

Figure 10:
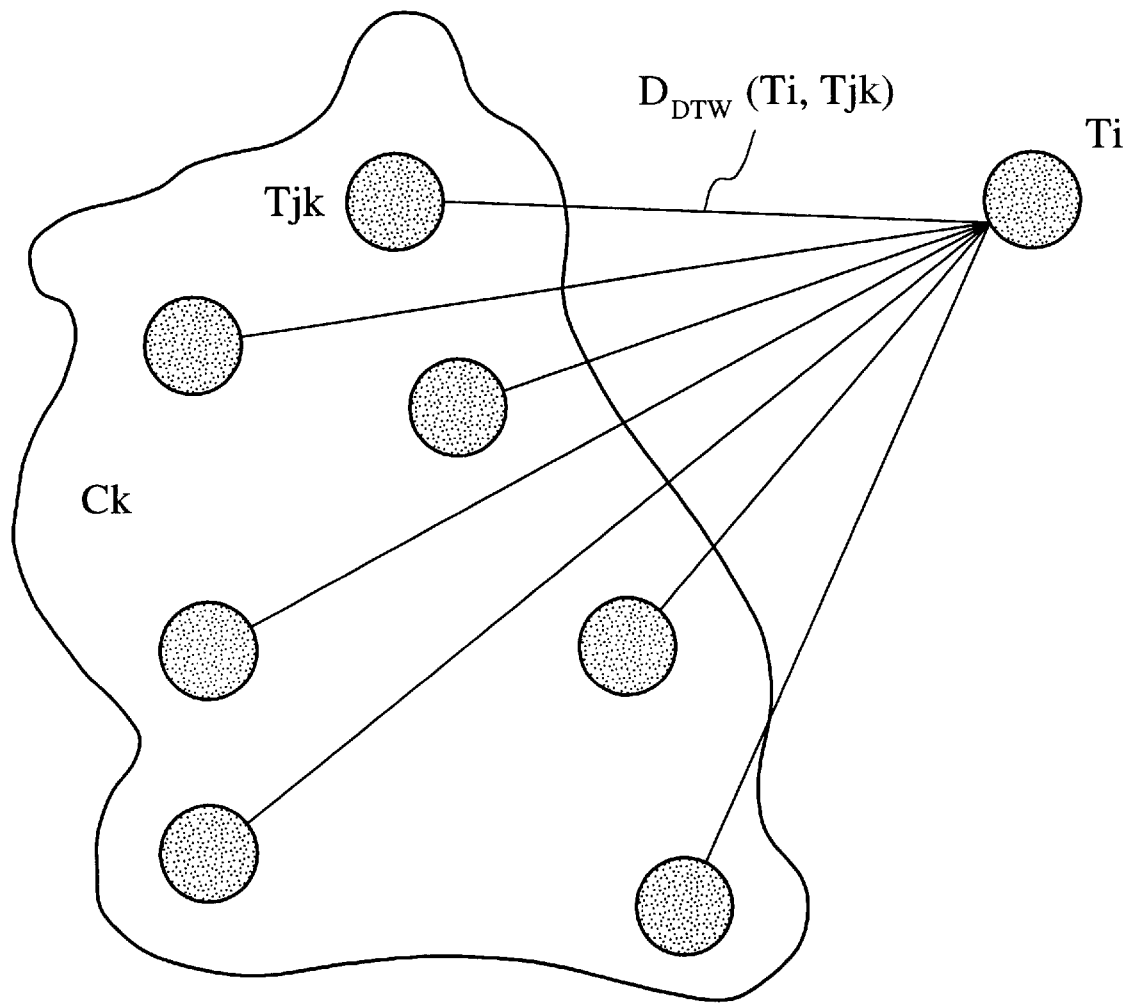
FIG. 10 is a diagram illustrating the process of calculating the distance between a trajectory and a cluster of trajectories.

FIG. 10 illustrates the calculation of the distance $D_{DTW}$ (Ti,Ck) between a trajectory $T_1$ and the $K^{th}$ cluster Ck containing j trajectories Tjk.

The distance between Ti and Ck is the average distance between Ti and each trajectory in Ck:

$$D(Ti, Ck) = AVG[D_{DTW}(Ti, Tjk)],$$

where j=1 to the number of clusters in Ck. Note that the distance between Ti and each Tjk in the cluster Ck has already been computed and is stored in the upper triangular matrix 76. Therefore, the process of determining which cluster Ck is closest to a trajectory Ti only involves averaging the values retrieved from the upper triangular matrix 76. The trajectory Ti is then assigned to the cluster Ck from which it is separated by the lowest average distance. After a trajectory Ti has been assigned to a cluster Ck, a label is appended to the trajectory Ti identifying the cluster number k.

Once every trajectory has been assigned to a cluster, the clusters may be merged to form larger clusters using the technique described above. The appropriate point for terminating the merging of clusters may be ascertained by evaluating the effect of the number of clusters per letter on overall handwriting recognition performance. In a preferred embodiment of the present invention, the clustering process is stopped when the number of clusters ranges between two and five per 10,000 occurrences of a letter. Having more than five clusters may result in small clusters that do not have a sufficient number of training samples to provide robust statistics.

Referring back to FIG. 5, according to the present invention, the clusters created by the scoring and clustering process 46 for a particular letter are characterized as handwriting prototype sets 48, where each cluster represents a prototype or subcategory of the letter. The Handwriting prototype sets 48 of the present invention are widely applicable in handwriting processing.

In general, the present invention provides an automatic, feature space-driven way to subdivide training data along boundaries that are determined quantitatively in an automatic (unsupervised) way. This is achieved by the analysis of the statistical properties of the trajectories contained in each cluster. For instance, when generating five clusters from 10,000 occurrences of the lower case letter "a", most of the occurrences in one of the clusters may correspond to the case where the letter "a" is the initial letter in a word. Thus, by analyzing clusters and distribution of the testing data, in those clusters, this method offers a tool for automated data analysis.

Besides automated data analysis, the handwriting prototype sets 48 may be used to construct handwriting recognizers based on the prototypes found in the training data. In a preferred embodiment of the present invention, the handwriting prototype sets 48 are used to construct an HMM-based handwriting recognizer. The handwriting prototype sets 48 may also be used to construct neural network and knowledge-based handwriting recognizers, among others.

In one preferred embodiment, after the handwriting prototype sets 48 are defined for the training data, one HMM is constructed to model each handwriting prototype of a particular letter. This results in a plurality of HMMs for each letter in the alphabet. In this description, the plurality of HMMs modeling a particular letter are referred to as a "network" of HMMs.

Figure 1:
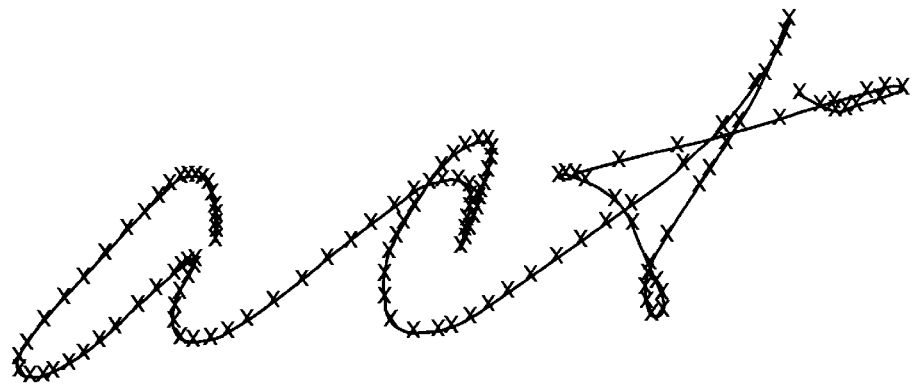
FIGS. 1 depicts a graphical example of sample points generated from a digitized handwriting sample.
Figure 2:
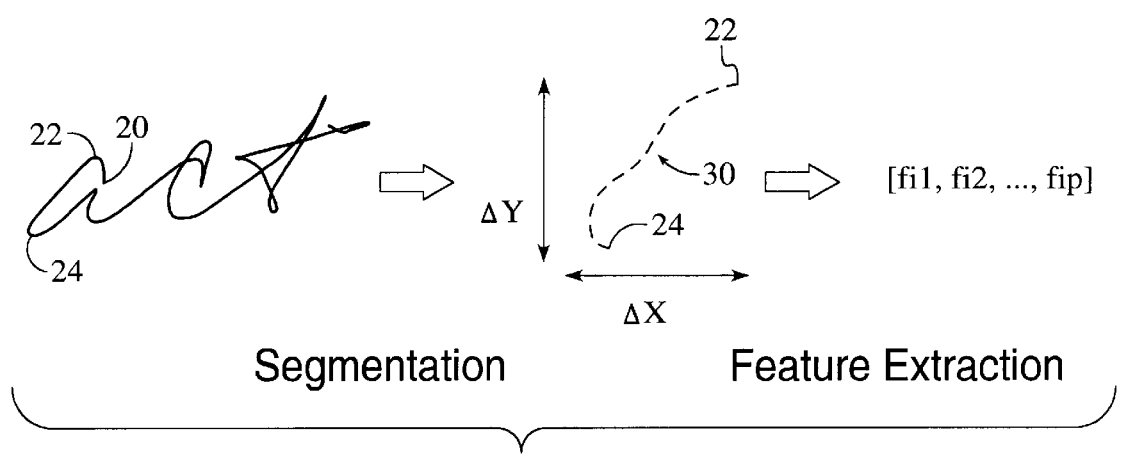
FIG. 2 depicts a graphical example of a segmentation and feature extraction process performed on the word "act".
Figure 3:
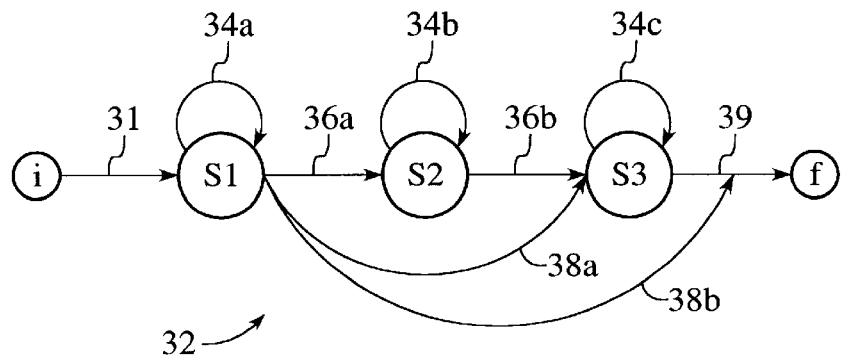
FIG. 3 graphically depicts the form of a three-state HMM.
Figure 4A:
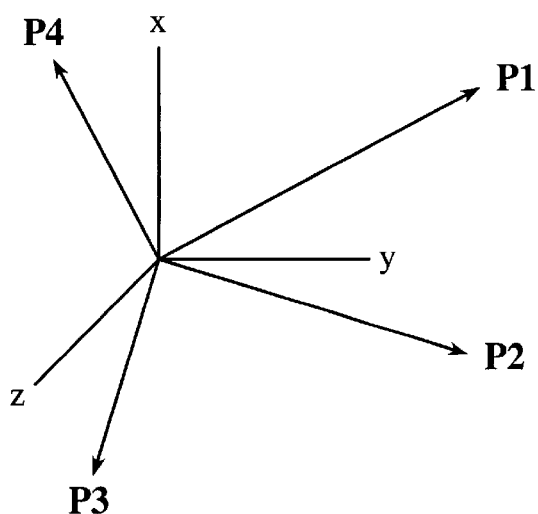
FIG. 4A depicts four feature vectors which represent a particular letter having four segments.
Figure 4B:
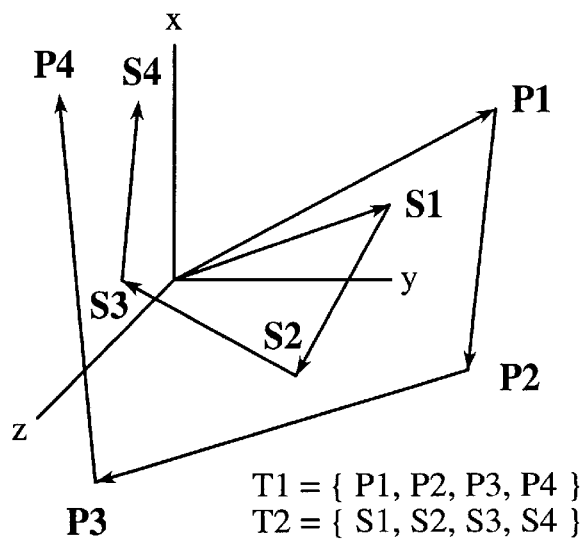
FIG. 4B is a diagram illustrating the trajectory of two occurrences of a letter, where each trajectory is formed from a sequence of four feature vectors.
Figure 11:
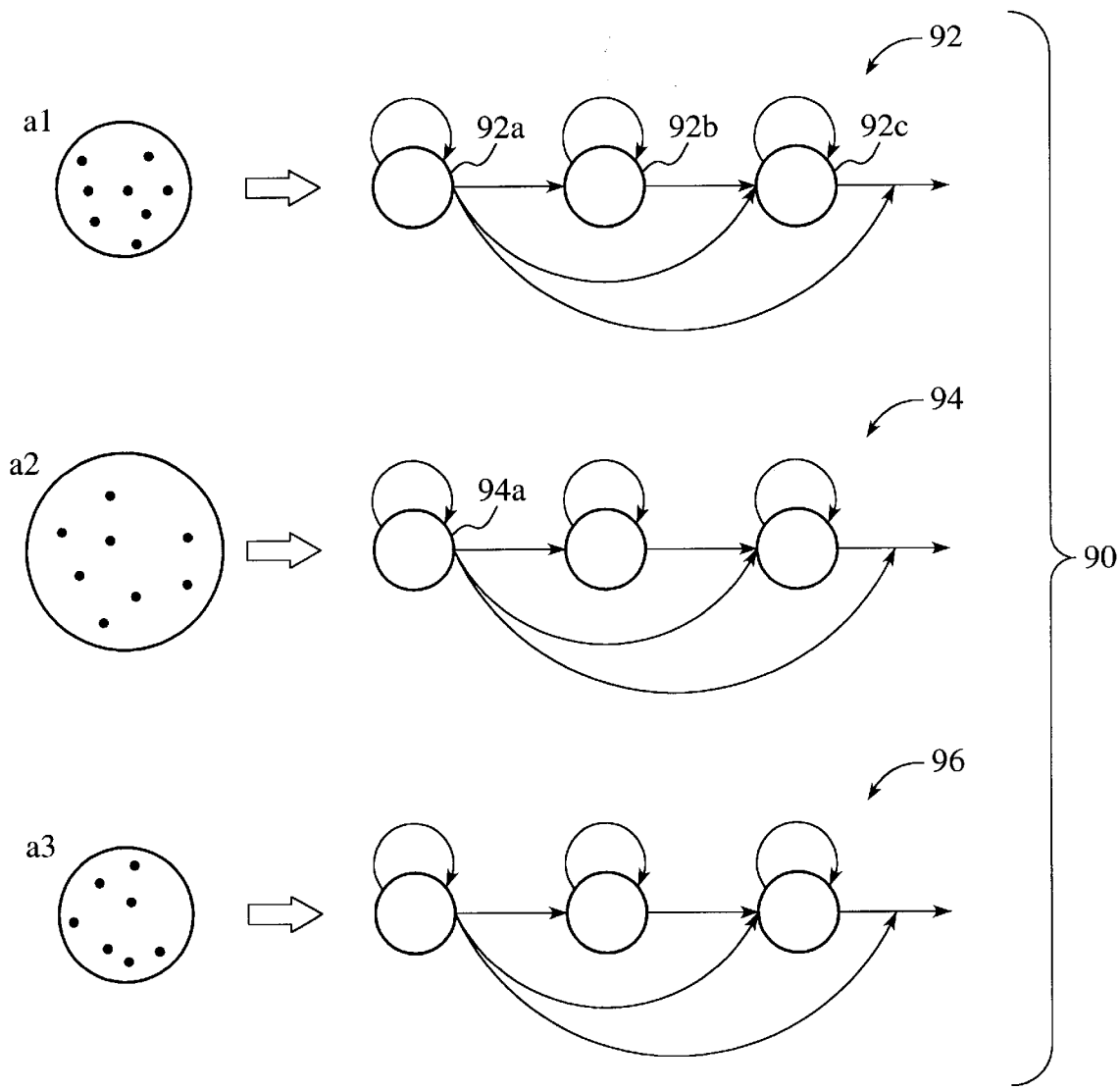
FIG. 11 is a diagram graphically illustrating how clustering information is used to derive statistics with which to initialize an HMM network.

FIG. 11 graphically illustrates how clustering information for a letter is used to derive statistics with which to initialize a network of HMMs 90. FIG. 11 shows three clusters, a1, a2, and a3 generated from occurrences of the letter "a" found in training handwriting data 40. The dots inside clusters a1, a2, and a3 represent trajectories of separate occurrences of the letter "a" (see FIG. 4B), and according the present invention, each cluster a1, a2, and a3 represents a prototype of the letter "a". Thus, a standard HMM 92, 94, and 96 may be constructed to model the statistics of the trajectories found in prototypes a1, a2, and a3, respectively. Since the three HMMs 92, 94, and 96 each model a prototype of the letter "a", HMMs 92, 94, and 96 are said to form a network of HMMs 90 for the letter "a", where HMM 92 in the network 90 is biased to model the types of trajectories captured in cluster a1; HMM 94 is biased to model the types of trajectories captured in cluster a2; and HMM 96 is biased to model the types of trajectories captured in cluster a3.

The statistics generated from the trajectories of each cluster are used to initialize or train the HMM network 90. For example, statistics generated for all first and second feature vectors found in trajectories of prototype a1 may be compiled and modeled as probabilities by a first state 92a of HMM 92. The statistics generated for all third and fourth feature vectors found in trajectories of prototype a1 may be compiled and modeled as probabilities by a second state 92b of HMM 92, and so on. Likewise, the statistics generated for all first and second feature vectors found in trajectories of prototype a2 may be compiled and modeled as probabilities by a first state 94a of HMM 94 etc.

Following the initialization step, formal training methods must still be used to obtain optimal performance (beyond the scope of this discussion). However, after the network of HMMs 90 is trained, the network 90 may perform the recognition of test data using the probabilities generated from the trajectories in the prototypes. Each of the HMMs 92, 94, and 96 calculate the likelihood that it could have produced a set of feature vectors observed in the test data. The highest computed probability of the HMMs 92, 94 and 96 is then utilized as the output of the network 90. The resulting probability generated by the network 90 will be higher than the probability generated by a single HMM modeling the letter "a" when the occurrence of the letter "a" to be recognized falls into a previously identified prototype of the letter "a".

In another preferred embodiment, the handwriting prototype sets 48 are used as a basis for adaptive handwriting recognition. An adaptive handwriting recognizer is a recognizer which has been formally trained, but is capable of adapting its recognition for a specific person or persons. During the adaption process, the new user is prompted by the system to handwrite a series of test words. In this case the handwriting recognizer determines whether the incoming handwriting data consists of a unique style or not. Since the words corresponding to incoming handwriting data is known, each segment of the test data is assigned to a letter in the known word using HMM-based alignment to form trajectories in feature space, as described above. These trajectories are then tested for likelihood of membership in each of the previously defined clusters for a given letter (or pattern) by measuring average distance to each cluster. If the distance between each cluster and the trajectory is greater than some predetermined distance, the data is thereafter treated as a unique style of that letter and a new cluster is generated. The recognizer is then re-initialized to recognize the new cluster and tailored as described above. This invention therefore offers a significant step in the direction of an automatic, data-driven, adaptive handwriting recognizer.

In yet another preferred embodiment, the Handwriting Prototype sets 48 may be used for automatic screening of handwriting data for a handwriting training database by setting some threshold value of similarity, and only the cases over the threshold need be visually inspected. The use of dynamic time warping methods to derive similarity scores allows any pair of letter occurrences to be compared. Similarly, automated handwriting verification may be implemented by monitoring the propensity for a set of handwriting data to form new clusters, rather than agglomerating the data with existing clusters.

In summary, an automatic, unsupervised method for scoring and clustering prototypes of stroke-based handwriting data has been disclosed which is widely applicable in the processing of handwriting data for: 1) generating initial statistical descriptions of handwriting prototypes for the training recognizers; 2) partitioning training data into prototypes for the construction of handwriting recognizers based on those prototypes; 3) creating adaptive handwriting recognizers which can detect new handwriting prototypes; and 4) screening unfamiliar handwriting occurrences for a handwriting training database.

The invention, however, is not limited to the embodiment depicted and described. Rather, the scope of the invention is defined by the appended claims. For instance, the software used to implement the present invention is not limited to any type of specific computer hardware platform, although as with most programs, performance may be enhanced with faster hardware processors and increased memory.

What is claimed is:

1. A method for processing digitized stroke-based handwriting data of known character strings, each segment of said known character strings being represented by a feature vector, said method comprising the steps of:

determining a trajectory of said feature vectors in each of said known character strings corresponding to a particular character, an ith one of said trajectories $T_i$ having n of said feature vectors, $T_i = \{P_1^i, P_2^i, \ldots P_n^i\}$, and a jth one of said trajectories $T_j$ having m of said feature vectors, $T_j = \{P_1^j, P_2^j, \ldots P_m^j\}$;

determining a separation distance $d_{i,j}$ between each pair of said trajectories $T_i$ and $T_j$ by forming a distance matrix $D_{i,j}$ where a (k,l) entry $D_{i,j}$(k,l) of said distance matrix $D_{i,j}$ is equal to a distance between $P_k^i$, a kth one of said feature vectors of said trajectory $T_i$, and $P_l^j$, an lth one of said feature vectors of said trajectory $T_j$;

determining an entry-to-entry path in said distance matrix $D_{i,j}$ from $D_{i,j}(1,1)$ to $D_{i,j}(n,m)$ such that a sum of entries along said entry-to-entry path is a minimum, and setting said sum equal to said separation distance $d_{i,j}$; and grouping said trajectories into clusters, such that said separation distance of a first pair of said trajectories in a first cluster is smaller than said separation distance of a second pair of said trajectories, said trajectories of said second pair being in different ones of said clusters.

2. The method of claim 1 wherein a first trajectory is included in a first cluster when a first average of said separation distances between said first trajectory and all of said trajectories in said first cluster is smaller than a second average of said separation distances between said first trajectory and all of said trajectories in a second clusters.

3. A method for processing digitized stroke-based handwriting data of known character strings, each of said character strings being represented by mathematical feature vectors, said method comprising the steps of:

labelling a subset of said plurality of feature vectors as corresponding to a particular character in said character strings;

forming a trajectory for said each one of said plurality of feature vectors labelled as corresponding to said particular character in said character strings, thereby providing a first plurality of trajectories corresponding to every occurrence of said particular character in said handwriting data;

calculating a distance value for each pair of said first plurality of trajectories using a dynamic time warping method, wherein said dynamic time warping step further including the steps of:

determining a separation distance $d_{i,j}$ between a pair of said first plurality of trajectories, $T_i$ and $T_j$ where $T_i = \{P_1^i, P_2^i, \ldots P_n^i\}$ and includes n of said feature vectors, $T_j = \{P_1^j, P_2^j, \ldots P_m^j\}$ and includes m of said feature vectors; by forming a distance matrix $D_{i,j}$ where a (k,l) entry $D_{i,j}$(k,l) of said distance matrix $D_{i,j}$ is equal to a distance between $P_k^i$, a kth one of said feature vectors of said trajectory $T_i$, and $P_1^j$, an lth one of said feature vectors of said feature vectors of said trajectory $T_j$;

determining an entry-to-entry path in said distance matrix $D_{i,j}$ from $D_{i,j}(1,1)$ to $D_{i,j}(n,m)$ such that a sum of entries along said entry-to-entry path is a minimum, and setting said sum equal to said separation distance $d_{i,j}$;

grouping particular ones of said first plurality of trajectories having the closest ones of said distance values to form a plurality of clusters;

successively merging said plurality of clusters to form larger clusters based on said distance values; and identifying subcategories of said particular character using said larger clusters.

4. A method as in claim 3 further including the steps of:
characterizing each of said larger clusters as handwriting prototypes; and
providing a handwriting recognizer based on said statistics generated from said prototypes.

5. A method as in claim 4 further including the steps of:
providing a Hidden Markov Model-based handwriting recognizer wherein one Hidden Markov Model models each of said handwriting prototypes; and
creating a network of said Hidden Markov Model for said particular character.

6. A method as in claim 3 further including the step of:
creating an upper triangular matrix to store each of said distance values calculated for said each pair of said first plurality of trajectories.

7. A method as in claim 6 further including the steps of:
performing segmentation on each of said character strings to partition said strings into a plurality of segments;
extracting a plurality of values from said segments corresponding to static properties in said segments; and
forming said feature vectors from said plurality of values.

8. A method for processing digitized stroke-based handwriting data of known character strings, said handwriting data having (N) occurrences of a particular character, wherein each of said (N) occurrences is represented by a set of mathematical feature vectors, said method comprising the steps of:

creating a trajectory from each one of said sets of feature vectors;

calculating a distance value between each pair of trajectories using dynamic time warping to provide a plurality of distance values, wherein said dynamic time warping step further including the steps of:

determining a separation distance $d_{i,j}$ between a pair of said first plurality of trajectories, $T_i$ and $T_j$ where $T_i = \{P_1^i, P_2^i, \ldots P_n^i\}$ and includes n of said feature vectors, $T_j = \{P_1^j, P_2^j, \ldots P_m^j\}$ and includes m of said feature vectors; by forming a distance matrix $D_{i,j}$ where a (k,l) entry $D_{i,j}$(k,l) of said distance matrix $D_{i,j}$ is equal to a distance between $P_k^i$, a kth one of said feature vectors of said trajectory $T_i$, and $P_1^j$, an lth one of said feature vectors of said trajectory $T_j$;

determining an entry-to-entry path in said distance matrix $D_{i,j}$ from $D_{i,j}(1,1)$ to $D_{i,j}(n,m)$ such that a sum of entries along said entry-to-entry path is a minimum, and setting said sum equal to said separation distance $d_{i,j}$;

grouping a first plurality of said trajectories into a first cluster;

grouping a second plurality of said trajectories into a second cluster;

for a first one of said trajectories, calculating a first average distance value between said first one of said trajectories and said first cluster by averaging each of said plurality of distance values between said first trajectory and each of said first plurality of said trajectories;

calculating a second average distance value between said first one of said trajectories and said second cluster by averaging each of said plurality of distance values between said first trajectory and each of said second plurality of said trajectories;

assigning said first one of said trajectories to said first cluster if said first average distance value is less than said second average distance value, and assigning said first one of said trajectories to said second cluster if said second average distance value is less than said first average distance value; and defining a first and second prototype corresponding to said first and second clusters to represent similar occurrences of said particular character.

9. A stroke-based handwriting data processing system, wherein said stroke-based handwriting data contains a known character string, said system comprising:

signal processing means for generating segments from said stroke-based handwriting data from a plurality of samples, said signal processing means including means for characterizing each of said segments from each of said samples as a feature vector;

alignment means for labelling each of said feature vectors as corresponding to a particular character in said character string;

trajectory formation means for forming a trajectory for each of said feature vectors labelled as corresponding to a particular character in said character string;

scoring means for calculating a similarity score between each pair of said trajectories, wherein said scoring means includes:

dynamic time warping means for determining a separation distance $d_{i,j}$ between a pair of said first plurality of trajectories $T_i$ and $T_j$ where $T_i=\{P_1^i, P_2^i, \ldots P_n^i\}$ and includes n of said feature vectors, and $T_j=\{P_1^j, P_2^j, \ldots P_m^j\}$ and includes m of said feature vectors;

said dynamic time warping means including:

matrix means for forming a distance matrix $D_{i,j}$ where a (k,l) entry $D_{i,j}(k,l)$ of said distance matrix $D_{i,j}$ is equal to a distance between $P_k^i$, a kth one of said feature vectors of said trajectory $T_i$, and $P_1^j$, an lth one of said feature vectors of said trajectory $T_j$;

calculation means for calculating an entry-to-entry path in said distance matrix $D_{i,j}$ from $D_{i,j}(1,1)$ to $D_{i,j}(n,m)$ such that a sum of entries along said entry-to-entry path is a minimum, and setting said separation distance $d_{i,j}$ equal to said sum; and clustering means for grouping said trajectories into a plurality of clusters according to said similarity scores.

10. A system as in claim 9 wherein said clustering means includes means for successively merging said plurality of clusters to form larger ones of said clusters.

11. A system as in claim 10 further including means for defining a handwriting prototype from each of said clusters.

\* \* \* \* \*